May 2, 1950 W. M. CROSLEY 2,506,139
DUMP TRAILER
Filed Nov. 16, 1948
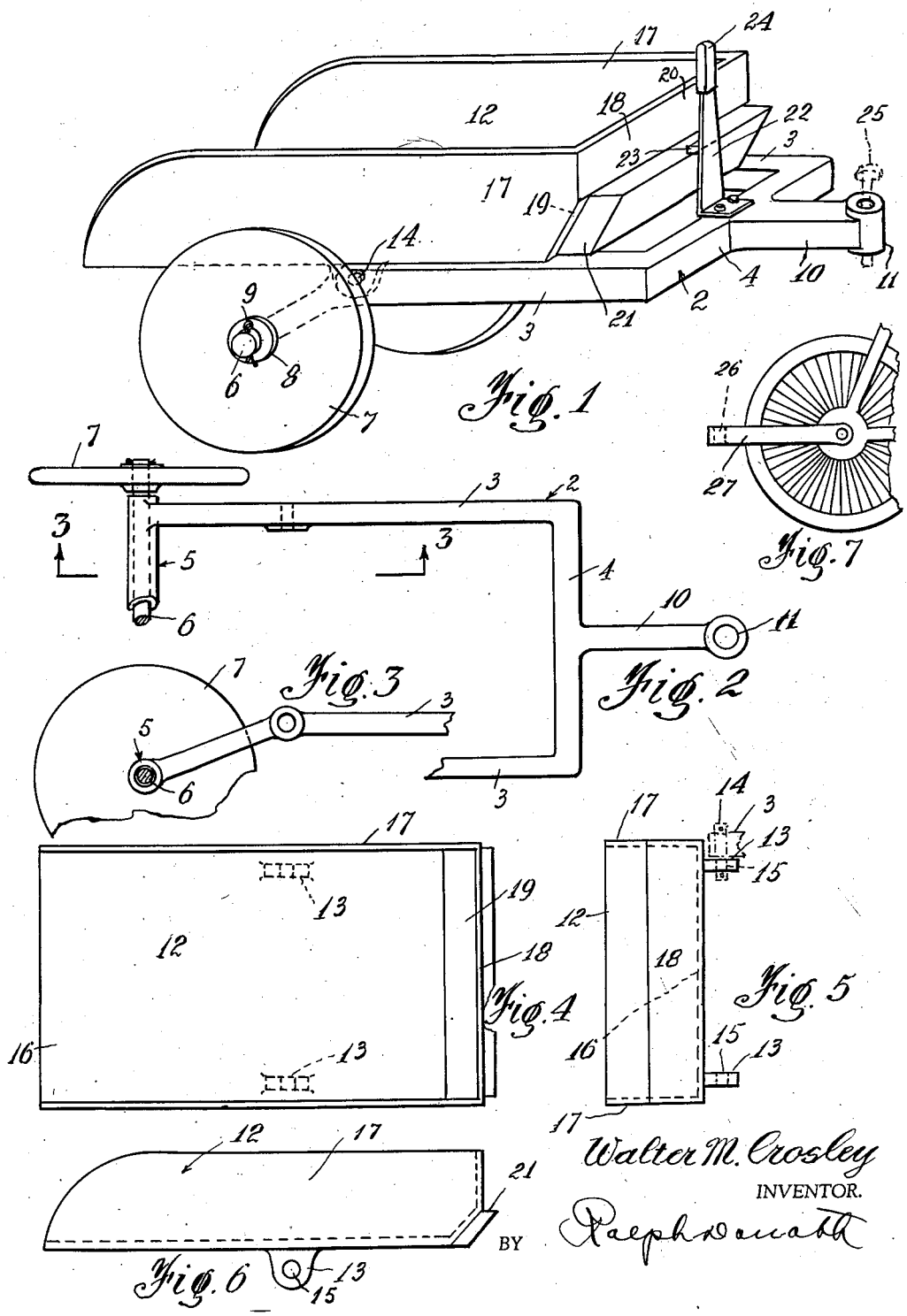
Walter M. Crosley
INVENTOR.
BY Ralph Donath Patented May 2, 1950

2,506,139

UNITED STATES PATENT OFFICE 2,506,139

DUMP TRAILER

Walter M. Crosley, Pittsburgh, Pa.

Application November 16, 1948, Serial No. 60,350

6 Claims. (Cl. 298—5)

This invention relates to dump trailers and more particularly to dump trailers or carts adapted to be attached to and drawn behind a bicycle, tricycle or the like.

It is frequently desirable to haul a considerable load with a bicycle. To accomplish this end, various means have been suggested in the past. Among such means are wire baskets suspended from the handlebars and depending forward of the forks above the front wheel, and racks extending to the rear of the saddle and supported upon the rear axle. Such means have proven entirely unsatisfactory for hauling any considerable load and generally to affect the case of operation of the bicycle. It is also impossible to unload from such means without rehandling the load.

I have invented a novel dump trailer by means of which considerable loads may be hauled behind a bicycle without encountering any of the above mentioned objections and difficulties.

My invention provides a dump trailer for bicycles or the like, comprising a frame having a pair of wheels mounted thereon, and means at the front of the frame for attaching the trailer to the bicycle. A box is pivotally mounted on this frame so that its center of gravity lies to the rear of the pivot point. A counterweight is placed on the box such that it will bring the center of gravity of the box back to or slightly forward of the pivot point. A latch preferably of spring steel, is attached to the front of the frame so as to lock the box in position on the frame.

In the accompanying drawings illustrating a presently preferred embodiment of my invention, Figure 1 is a perspective view of my invention.

Figure 2 is a plan view of the frame of the invention.

Figure 3 is a section on line 3—3 in Figure 2.

Figure 4 is a top plan view of the box as used in this invention.

Figure 5 is a front elevation of Figure 4.

Figure 6 is a side elevation of Figure 4.

Figure 7 is a fragmentary side elevation of a rear wheel and frame of a bicycle showing a means for attaching the trailer.

Referring first to Figure 1, I have illustrated a dump trailer having a frame 2 with angular side members 3 forming a part thereof. A cross member 4 connects the side members 3 and forms the rear of the frame 2. An axle 6 passes through the hollow cross member 5 and extends beyond its ends.

Wheels 7 are rotatably mounted on either end of the axle 6 and are held in position by annular rings or washers 8 and cotter pins 9. A draft arm 10 having an attaching eye 11 projects from the center of the front cross member 4.

A box 12 having lugs 13 is attached to the frame by means of pins 14 which pass through the lugs 13 and are journaled in openings 15 in the frame. The box itself consists of a bottom 16, two sides 17, and a front end 18 made of three parts, a sloping wall 19, a vertical wall 20, and a counterweight 21 attached to the sloping wall 19. A spring steel latch 22 is attached to the front cross member 4. A horizontal projection 23 extends outwardly from the latch 22 so as to engage the counterweight 21. A handle 24 is provided on the end of the latch 22 so as to make disengagement of the latch easier when releasing the box.

The dump trailer of my invention may be attached to a bicycle by passing a pin 25 through the eye 11 in the draft arm 10 and into a similar eye 26 attached to the bicycle stand 27 or by any similar device.

When the trailer is empty, the counterweight 21 acts to bring the front of the box 12 down onto the frame 2. As the empty box drops to the frame, the sloping front of the counterweight 21 engages the projection 23 on the latch 22 and acts to force it back, permitting the box to go downward. When the box reaches the frame, the projection 23 is above the counterweight 21 and the latch 22 springs back so that the projection 23 locks the box 12 in position on the frame.

When the box 12 is loaded, the center of gravity shifts to the rear of the lugs 13. If the latch is then pulled forward, the projection 23 is released from its position above the counterweight 21, and the box 12 pivots about pins 14, dumping the load from the rear of the box. The load having been dumped, the center of gravity shifts back to a point slightly forward of the lugs 13 because of counterweight 21, and the front of the box drops to the frame as described above.

It is clear that my invention has many advantages not found in previous means for hauling loads with a bicycle.

My trailer does not adversely effect the stability of the bicycle, nor does it affect its steering in any way. Moreover, it is possible to unload the trailer and have the box return to its position on the frame without dismounting from the bicycle. Rehandling of the load is thereby avoided.

Although I have illustrated and described a presently preferred embodiment of my invention, it is to be understood that it may be otherwise embodied within the scope of the following claims.

I claim:
1. A dump trailer for bicycles or the like, comprising a frame, a pair of wheels on said frame, a box pivotally mounted on said frame, counterweight means on the front of said box, latch means on the frame adapted to hold the box in position on the frame, and pivotal means at the front of said frame for attaching the trailer to a bicycle or the like.

2. A dump trailer for bicycles or the like, comprising a frame, a front cross member on said frame, angular members forming sides of the frame, wheels on the frame, a box pivoted on said frame at the apex of the side member angles, counterweight means on the front of the box, latch means mounted on the front cross member, said latch means cooperating with the counterweight means to hold the box in position on the frame, and means on said frame for attaching the trailer to a bicycle or the like.

3. A dump trailer for bicycles or the like, comprising a frame, a pair of wheels on said frame, angular members forming sides of the frame, a box pivoted on said frame adjacent the apex of the angular members, said box being pivoted so that its center of gravity lies at the point behind the pivot point, a counterweight means on the front of said box, latch means mounted on the frame and cooperating with the counterweight means to hold the box in position on the frame, and means on said frame for attaching the trailer to a bicycle or the like.

4. A dump trailer for bicycles or the like, comprising a frame, a pair of wheels on said frame, a box pivotally mounted on the frame, counterweight means on the front of said box, resilient latch means mounted on the front of said frame adapted to cooperate with the counterweight means to hold the box in position on the frame, and coupling means at the front of the frame for attaching the trailer to a bicycle or the like.

5. A dump trailer comprising a frame, a hollow rear cross member on said frame, an axle journaled in said cross member, a pair of wheels on said axle, a pair of angular side members forming a part of said frame, a box pivotally mounted on the frame at a point adjacent the apex of the side member angles, counterweight means on the front of said box, latch means on the front of the frame adapted to hold the box in position on the frame, and a draft arm on said frame having means for attaching the trailer to a bicycle or the like.

6. A dump trailer for bicycles or the like, comprising a frame, a pair of wheels on said frame, angular members forming sides of the frame, a box pivoted on said frame adjacent the apex of the angular members, said box being pivoted so that its center of gravity lies at the point behind the pivot point, counterweight means on the front of said box sufficient to shift the center of gravity back to a point slightly forward of the pivot point, latch means on the frame for engaging the box, and means on the frame for attaching the trailer to a bicycle or the like.

WALTER M. CROSLEY.

REFERENCES CITED

The following references are of record in the file of this patent:

UNITED STATES PATENTS

| Number | Name | Date |
|---|---|---|
| 534,758 | Pratt | Feb. 26, 1895 |
| 829,301 | Storck | Aug. 21, 1906 |

FOREIGN PATENTS

| Number | Country | Date |
|---|---|---|
| 5,547 | Great Britain | 1902 |
| 771,072 | France | 1934 |
| 103,867 | Australia | 1938 |